US008086743B2

(12) United States Patent
Miller et al.

(10) Patent No.: US 8,086,743 B2
(45) Date of Patent: Dec. 27, 2011

(54) MULTI-CHANNEL COMMUNICATION WITH REQUEST REORDERING OR REPRIORITIZATION

(75) Inventors: Edward Scott Miller, Kirkland, WA (US); Evgueni Salnikov, Redmond, WA (US); Jeffrey C. Stamerjohn, Redmond, WA (US); Aaron Szafer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/483,354

(22) Filed: Jun. 12, 2009

(65) Prior Publication Data

US 2010/0318667 A1    Dec. 16, 2010

(51) Int. Cl.
    *G06F 15/16*     (2006.01)
(52) U.S. Cl. .......... 709/228; 709/203; 709/227
(58) Field of Classification Search .......... 709/203, 709/223, 227, 228; 382/100, 128
See application file for complete search history.

(56) References Cited

U.S. PATENT DOCUMENTS

| | | | |
|---|---|---|---|
| 6,895,128 B2 * | 5/2005 | Bohnenkamp | 382/128 |
| 7,400,678 B2 | 7/2008 | Dankworth et al. | |
| 7,409,454 B2 | 8/2008 | Wynn et al. | |
| 2005/0021375 A1 * | 1/2005 | Shimizu et al. | 705/2 |
| 2008/0301305 A1 * | 12/2008 | Huang | 709/228 |
| 2009/0077173 A1 * | 3/2009 | Lowery et al. | 709/203 |
| 2010/0290678 A1 * | 11/2010 | Dekel | 382/128 |

OTHER PUBLICATIONS

Padmanabhan, Venkata N., "Persistent-Connection HTTP", chapter 5 in "Addressing the Challenges of Web Data Transport", retrieved at <<http://research.microsoft.com/en-us/um/people/padmanab/thesis/phttp.ps.gz.>>, dated Sep. 1998, pp. 72-95.
Deshpande, et al., "Scalable Streaming of JPEG2000 Images using Hypertext Transfer Protocol", retrieved at <<http://www.cs.missouri.edu/~zengw/acmmultimedia01_httpstream_jpeg2k_final_preprint.pdf>>, In Proc. ACM Multimedia, Oct. 2001, 9 pages.
Fielding, et al., "Connections", chapter 8 in "Hypertext Transfer Protocol—HTTP/1.1" RFC 2616, retrieved at <<http://www.servlets.com/rfcs/rfc2616-sec8.html>>, document dated: Jun. 1999 (retrieved on Apr. 17, 2009), 10 pages.
Chen, Xin, "Performance Analysis of Persistent Hypertext Transfer Protocol (HTTP) Over Satellite Links", retrieved at <<http://www.ohiolink.edu/etd/send-pdf.cgi/Chen%20Xin.pdf?acc_num=ohiou1177605718>>, Nov. 1997, pp. i-vi and 1-40.
"Comparing HTTP Streaming Protocol with RTSP", retrieved at <<http://msdn.microsoft.com/en-us/library/bb905764.aspx>>, dated Aug. 28, 2008, 2 pages.
Liang, et al., "A Bandwidth Effective Streaming of JPEG2000 Images using HyperText Transfer Protocol", in Proceedings of 2002 IEEE International Conference on Multimedia and Expo (ICME '02), Aug. 26-29, 2002, pp. 525-528.

* cited by examiner

*Primary Examiner* — Ramy M Osman

(57) ABSTRACT

In one example, a client and a server may communicate with each other using a control channel and a data channel. The control channel carries requests from the client to the server, and the data channel carries the server's response to these requests. Some requests submitted on the control channel may be assigned identifiers, so as to be addressable. A client may submit, over the control channel, a request to cancel previously-made requests. A cancelation request uses the identifiers associated with the previously-made requests to identify the request(s) to be canceled. The client may open the control and data channels by issuing POST and GET requests, respectively, to the server. Control channel communications may then be sent as part of the POST message, and data channel communications may be sent as responses to the GET request.

17 Claims, 4 Drawing Sheets

MULTI-CHANNEL COMMUNICATION WITH REQUEST REORDERING OR REPRIORITIZATION

BACKGROUND

Many communication protocols, such as Hypertext Transfer Protocol (HTTP), transfer data using a connection paradigm. In order to transmit data, some type of handshaking is performed to open the connection. Data is then transmitted, and, at some later point in time, the connection is closed.

In HTTP, a connection is opened by the client using a particular method. HTTP supports various types of methods, such as GET methods (for retrieving data from the server), and POST methods(for transmitting data to the server). In a GET method, the client requests that the server send a copy of some resource that is stored on, or created by, the server. In a POST method, the client requests that the server stand ready to receive some specified amount of data from the client. Thus, in theory a client and a server can exchange an arbitrary amount of information by continually opening HTTP connections with GET and POST methods.

However, continually opening HTTP may be an ineffective way to implement communication for some applications. Opening an HTTP connection is not cost-free. There is an overhead cost of time and resources involved in opening each connection. If a client wishes to send or receive many pieces of data per second to a server and opens a new connection for each piece, then the number of connections that are opened represents a significant overhead cost. HTTP provides some ways to reduce the number of connections. For example, HTTP provides a keep-alive mechanism in which the same connection may be kept open for an arbitrary time and re-used for plural requests. Also, HTTP provides a pipelining mechanism in which plural requests may be sent sequentially over the same connection. However, these mechanisms may be inadequate to implement certain scenarios.

For example, a medical imaging application may respond to instructions from a human operator as to what images the operator would like to see. The application may request specific images from a server in response to instructions from the operator (or may request images based on its own logic, without a specific instruction from an operator). Since a pipeline is opened for a finite number of requests, using a pipeline would force the application to group requests together artificially to be sent on a specific pipeline. Moreover, if an application wanted to cancel a request that had already been sent on the pipeline, then the application would have to open a new connection to transmit such a cancellation request. However, opening new connections (or re-using existing "keep-alive" connections) to transmit new instructions (such as cancelation requests) to the server incurs an administrative overhead cost.

SUMMARY

Communications between a client and a server may be implemented by opening plural connections. One of the connections may be used as a control channel, and another one of the connections may be used as a data channel. These connections may remain open indefinitely, or for a lengthy duration of time, thereby avoiding the overhead associated with frequent opening and closing of connections.

The control channel is used by a client to transmit requests to the server. For example, when the client requests data from the server, the client submits the request on the control channel. Also, if the client wants to cancel or reprioritize requests that have already been made, the client submits these cancelation or reprioritization requests on the control channel.

The data channel is used to transmit data from the server to the client. Thus, if the client uses the control channel to request data from the server, the server may respond by sending the requested data to the client over the data channel.

The control and data channels, in one example, may be implemented as HTTP connections initiated by the client as HTTP POST and HTTP GET methods, respectively (which may referred to hereinafter simply as "POST" methods and "GET" methods). To initiate a control channel, the client makes a connection to the server with a POST method and specifies a large message size. As requests from the client are submitted on the control channel over a period of time, these requests slowly consume the bytes allotted to the message, but the message size may be large enough that that control channel can remain open for a period of time. After the specified message size has been consumed, the connection on which the control channel is implemented is closed, and a new POST request is submitted to reopen the channel. The client creates the data channel by submitting a GET request to the server. When a server receives a GET request, the server responds by determining what data it will provide in response to the request. The server is configured to respond to the GET request by reacting to instructions received on the control channel. Thus, the server responds to the GET request by providing the data that the client has requested from the server through the control channel. When the server responds to the GET request, it may use "chunked" encoding. Chunked encoding allows the server to continue responding to the GET request after a given piece of data has been sent to the client, thereby allowing the server to send an arbitrarily amount of data to the client, over an arbitrarily long time horizon, on a given data channel. However, it is noted that the data channel could be implemented without chunked encoding—e.g., the data channel could be opened as a very large (e.g., 4 gigabyte) finite channel, which could then be closed and subsequently reopened after transmissions had exhausted the finite data size.

Requests sent by the client may be assigned identifiers, so as to make the requests addressable. Addressability of requests, combined with full-duplex communication between the client and the server, allows certain types of operations to be implemented, such as cancelation and reprioritization operations. If a client has submitted some number of requests, the client may subsequently cancel one or more of these requests by submitting a cancelation request over the control channel, where the cancelation request uses the target request's assigned identifier in order to indicate which request is to be canceled. The server may then respond by canceling the target request before the target request has been executed—or, if the target request already has been executed, the server may cancel the target request before the result of the target request has been transmitted back to the client, thereby reducing waste of transmission bandwidth. Similarly, a client may submit a reprioritization request, which requests that certain previously-submitted requests be executed with some priority other than the priority originally assigned to those requests.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
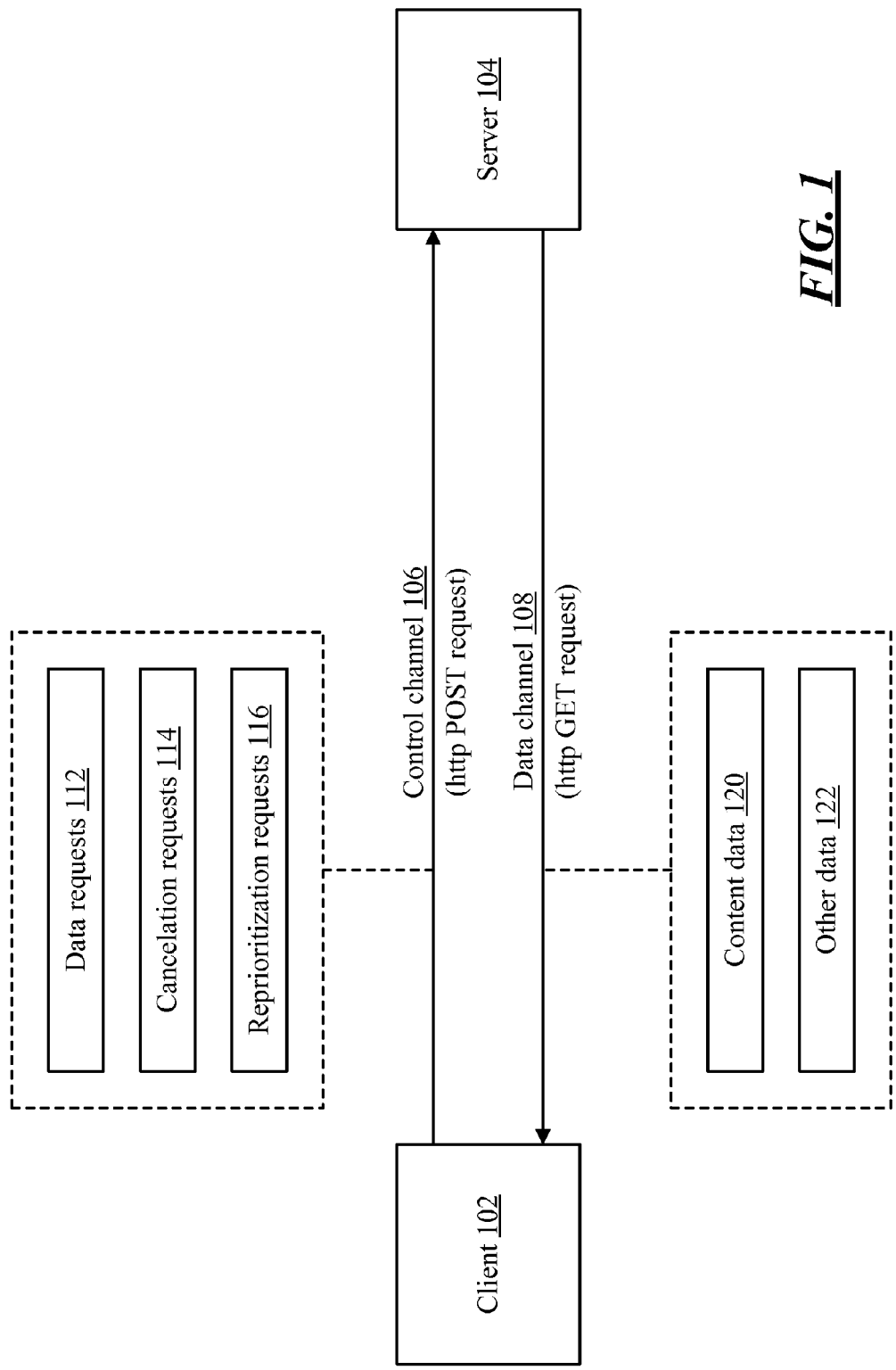
FIG. 1 is a block diagram of an example scenario in which a client and a server communicate using a control channel and a data channel.

Hypertext Transfer Protocol (HTTP) is a communication protocol that facilitates communication between a client and a server. HTTP is commonly used by client web browsers to communicate with web servers. However, a browser is merely one example of a client that can communicate via HTTP; any type of application may use HTTP.

In a typical HTTP communication, a client makes a connection to a server with a particular method. If the server accepts the connection, then a connection is established between the client and the server, and data are transmitted between the client and the server on the connection. HTTP supports various types of methods. Two common types of methods are the GET method (in which the client requests data from the server), and the POST method (in which the client sends data to the server).

One efficiency issue that arises in the use of HTTP is that some overhead is involved in establishing a connection. Each connection is established to serve a particular communication method, and the connection is destroyed after the communication is completed. So, for each communication, the client and server have to create a new connection, which incurs a cost in time and resources.

The HTTP standard has evolved to include various mechanisms that can be used, in certain circumstances, to reduce the number of connections that have to be created to support a sequence of communications. One such mechanism is the keep-alive mechanism that supports persistent connections. With the keep-alive mechanism, a connection is not destroyed after a request is serviced. When a connection uses the keep-alive mechanism, after a request has completed the client may use the same connection to issue a further request. Pipelining is another mechanism that can be used to reduce the number of connections. Pipelining allows a client to make several requests while expending only the overhead to open one connection. Moreover, the client can issue successive requests on the pipeline without having to wait for a response to each request.

While keep-alive and pipelining reduce the number of connections involved in making a given number of requests, these mechanisms have certain drawbacks that make them unsuited to support some scenarios. In one example scenario, a client requests and displays graphical data received from a server. For example, the client might be a medical imaging program that displays medical images based on data provided by a server. (Such a medical imaging program might be used to render images of some physical aspects of a patient's human body. The rendering of such images could be used as part of a process of making a diagnosis of a disease of the human body, or as part of a process of administering a medical treatment to the human body. Moreover, it is noted that "images" may refer to visible light representations (e.g., photographs), radiographs (e.g., X-rays), sound waves (e.g., medical ultrasound), etc.) Based on instructions that the client receives from an operator in real-time, the client may generate numerous requests to obtain specific images, or regions of images, from the server. For this type of application, the keep-alive mechanism does little to address the overhead problem. While the keep-alive mechanism avoids the overhead in creating a connection for each request, some overhead is associated with the process of re-using an existing connection. This overhead is incurred each time a keep-alive connection is reused, so the net savings realized by using the keep-alive mechanism may be small.

Pipelining may help to avoid overhead, but creates a different problem with regard to servicing real-time requests for which the response is graphical data or other high-volume data. Pipelined requests are replied to in the order in which they are received, which makes it difficult to cancel or reprioritize requests after they are sent. Serving high volume data (e.g., the kind of detailed graphics used in medical imaging applications) may take an appreciable amount of time. The client may wish to cancel a request before the server responds to it. But since pipelined requests are replied to in the order in which they are received, a cancelation request stands in line behind the requests that it is intended to cancel. Thus, the cancelation request may not be processed until the requests that the client is trying to cancel have already completed. A reprioritization request (i.e., a request to change the priority of one or more requests that have already been issued) presents similar issues.

The subject matter herein provides a way to use HTTP efficiently, and to allow certain types of request (e.g., cancelations, reprioritizations, etc.) to be serviced. A client may open two HTTP connections with the server. One of the connections serves as a control channel, and the other connection serves as a data channel. The control channel is used by the client to issue requests for data and to issue various types of administrative instructions to the server. The data channel is used to receive the data from the server. The client opens the control channel as a POST request. A POST request contains a message to be sent to the server, but the message can be sent in pieces over time. The client specifies a large size for the message. The specified message size is consumed by the information that the client sends on the control channel, but the message size is large enough that the connection can stay open for a long time before the entire message size specified in the request has been consumed by number of bytes transmitted on the control channel. Once an amount of data equal to the specified size has been transmitted, the control channel is closed, and a new POST request is issued by the client to open a new instance of the control channel. The data channel is opened by the client as a GET request. The server uses HTTP "chunked" encoding to send the data. With "chunked" encoding, the server can send an arbitrary amount of data in response to a GET request, and the server simply notifies the client when it has finished responding to the request. When the server sends data to the client, it treats the data (for HTTP purposes) as a response to the client's GET request. However, the server's actual choice of what data to send to the client is made in reaction to control data that the server receives on the control channel.

The client can issue various types of instructions on the control channel, including cancelations and reprioritizations. Instructions issued on the control channel have identifiers, so these instructions are addressable. Thus, a client can issue an instruction such as "cancel request #4", or "change the priority of request #2". Unlike pipelining—where request are replied to in the order in which they are issued—a server can process a cancel or reprioritization instruction before it has processed the requests upon which these instructions operate.

Turning now to the drawings, FIG. 1 shows an example scenario in which a client and a server communicate using a control channel and a data channel. Client 102 is communicatively connected to server 104. In one example, client 102 and server 104 are connected via a network that is, or that comprises, the Internet. However, client 102 and server 104 could be connected in any manner.

Client 102 and server 104 may communicate via HTTP, and have two HTTP connections open between them. These two connections may serve as control channel 106 and data channel 108 (with the arrows on control channel 106 and data channel 108 indicating direction of data flow). In the example shown, control channel 106 is implemented as an HTTP POST method, in which requests and/or instructions sent from client 102 to server 104 are sent as part of the message body. Also, in the example shown, data channel 108 is implemented as an HTTP GET method, server 104 sends data to client 102 as if the data were responsive to the GET method. When server 104 chooses which data to send to client 102, server 104 actually may be reacting to messages received from client 102 over control channel 106. However, since server 104 sends data to client 102 over the connection that is opened by the GET method, when server 104 sends this data, server 104 is technically, within the constructs of HTTP, responding to the GET method.

Client 102 may send various types of requests 110 on control channel 106. (HTTP uses the term "request" to refer to GET requests, POST requests, etc. Requests 110 are transmitted over an HTTP connection, but are not HTTP requests in the sense that they are not processed as part of the HTTP protocol. Rather, requests 110 are transmitted using HTTP, but are processed at a level higher than the HTTP layer—e.g., HTTP may simply deliver the requests to a server-side application for processing.) Requests 110 may include data requests 112, cancelation requests 114, and reprioritization requests 116, or other types of requests.

Data requests 112 are requests that client 102 issues to cause server 104 send data back to client 102. For example, if client 102 is, or comprises, a medical imaging application, then client 102 may request that server 104 send specific image frames, or parts of image frames. These types of requests are examples of data requests 112.

Cancelation requests 114 are requests to cancel a previous request. For example, client 102 might respond to a user's input by requesting certain images from the server. Before the server satisfies those requests, further user input might be received that nullifies the basis to obtain those images. Therefore, client 102 can send one or more cancelation requests 114 in order to request that the server not process the pending requests. As further described below, each request may have an identifier, and therefore may be addressable. So, if a data request has an identifier such as #2, then a cancelation request may use the identifier to specify which request the client is asking to cancel. It is possible that server 104 has already processed a request before the cancelation request is made. So, even if client 102 issues a cancelation request, client 102 might nevertheless receive the requested data, and may be prepared to deal with the receipt of such data (e.g., by ignoring the data when it arrives). But issuing a cancelation request creates an efficiency by allowing the server to avoid processing a previously-made request (if the server learns of the cancelation in time) and/or to avoid consuming the bandwidth to transmit the response to the client.

Reprioritization requests 116 are requests to change the priority of previously-issued requests. For example, if a client issues five requests—each having a particular level of priority—the client subsequently might want to change the priority of one or more of the requests. Reprioritization requests 116 may identify a specific order in which previously-made requests are to be processed by the server. As with cancelation requests 114, it is possible that server 104 will not receive reprioritization requests 116 in time to reorder the requests. But, if server 104 does receive reprioritization requests 116 in time to affect the previously-made requests, then server 104 can reprioritize those requests.

When server 104 reacts to the requests that it receives on control channel 106, server 104 may send various types of data 118 to client 102. One type of data that server 104 may send is content data 120. Continuing with the example in which client 102 is, or comprises, a medical imaging application, content data 120 may comprise image frames, or parts of image frames. The data sent on data channel 108, however, is not necessarily content data, but rather could be any other data 122.

Figure 2:
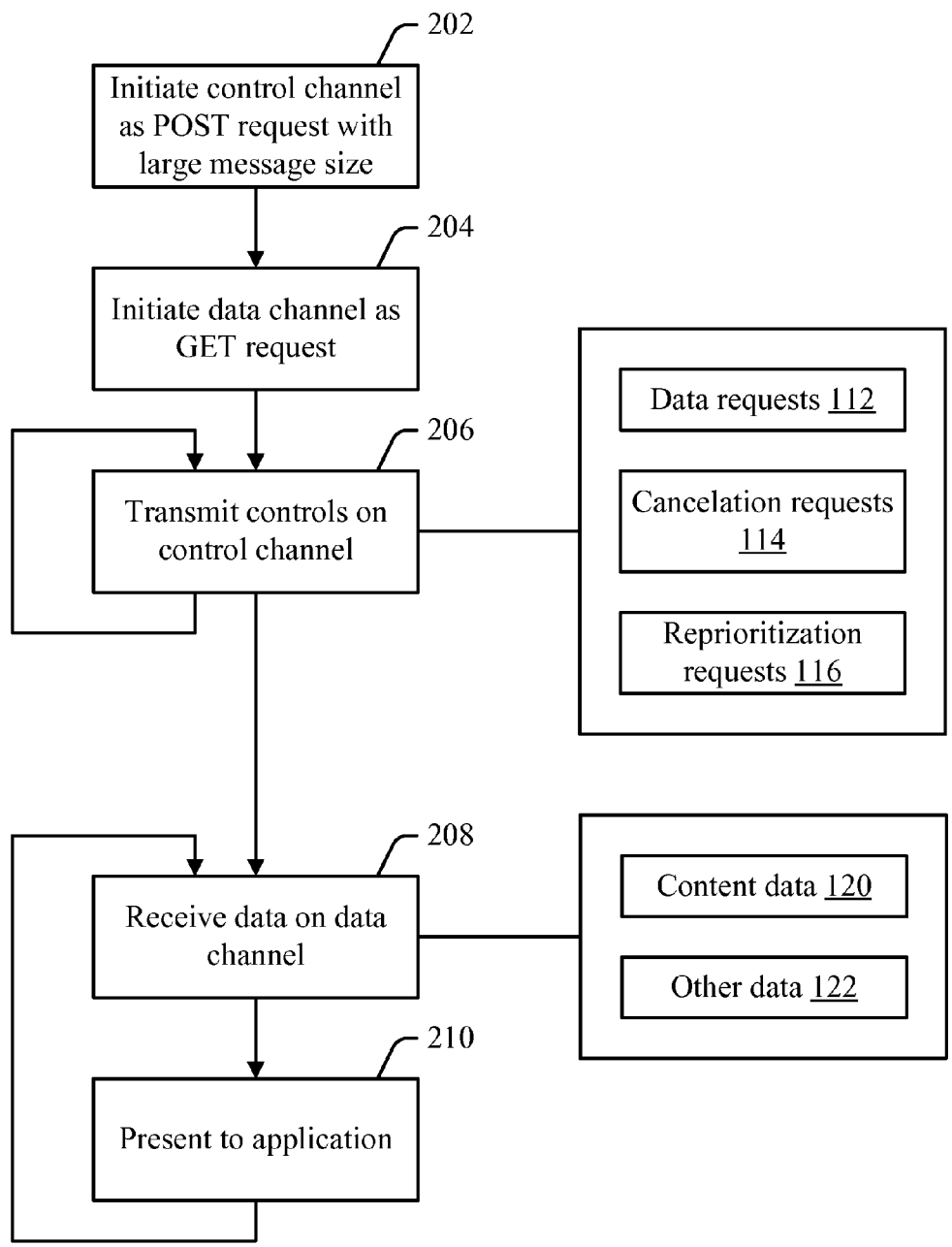
FIG. 2 is a flow diagram of an example process in which communication may occur between a client and a server.

FIG. 2 shows an example process in which communication may occur between a client and a server. Before turning to a description of FIG. 2, it is noted that FIG. 2 is described, by way of example, with reference to components shown in FIG. 1, although the process of FIG. 2 may be carried out in any system and is not limited to the scenario shown in FIG. 1. Additionally, FIG. 2 shows an example in which stages of a process are carried out in a particular order, as indicated by the lines connecting the blocks, but the various stages shown in the diagram can be performed in any order, or in any combination or sub-combination.

At 202, a client initiates a control channel. The control channel may be initiated by the client's making a POST request to the server, where the POST specifies a large message size. In HTTP, POST methods are used to transmit data from the client to the server in the form of a message. The request specifies the size of the message to be transmitted, but transmission of the message can be spread out over time, and over several communications. The "message" to be transmitted is the various requests that the client transmits to the server over the control channel. Thus, if each request transmitted on the control channel is a few bytes long, the specified size of the POST message is consumed in small pieces as the requests are made. Choosing a large message size (e.g., a few gigabytes) allows the client to transmit many requests before the specified size of the message has been exhausted. (When the requests that have been transmitted eventually exhaust the message size, the POST request is complete, and a new POST request may be issued to re-open the channel. If this re-opening occurs infrequently, then the overhead associated with opening a new connection does not cause any delay in communication that would be appreciable to a user.)

At 204, the client initiates a data channel. The data channel may be initiated by the client's making a GET request to the server. An HTTP GET method is a request to retrieve a specified resource. In many cases, GET methods are used to retrieve a specific file located on a server. However, the server can determine what to send to the client in response to the GET method. In the examples described herein, one of the server's functions is to respond to requests that the client issues on the control channel. Thus, when the server determines what data to send to the client in response to the GET method, the server reacts to instructions from the client that are received on the control channel. So, if the client uses the control channel to request image frames, (and, possibly, to cancel or re-prioritize previously-issued requests), the server determines what images to send in response to (non-canceled) data requests. Once the appropriate images have been identified, those images are sent on the data channel in response to the GET method. The data sent in response to the GET method may be "chunked" encoded, which allows the server to continue responding to the GET method with new data indefinitely.

In one example, the client opens one control channel and one data channel, although the client could open any number of control and/or data channels.

Once the control and data channels are open, the client transmits controls on the control channel (at 206), and receives data on the data channel (at 208). The controls transmitted on the control channel may include data requests 112, cancelation requests 114, and/or reprioritization requests 116, as described above in connection with FIG. 1. The data received on the data channel may include content data 120 and other data 122, as also discussed above in connection with FIG. 1. (Acknowledgements, time sync updates, etc., are examples of other data 122, although the subject matter herein is not limited to these examples.) When the client receives the data on the data channel, data is presented to the application for use by the application (at 210). Thus, in the above-mentioned example where the client is a medical imaging application, the client may make use of an HTTP engine that receives and transmits data over HTTP. When data (e.g., image data) is received from the server by the client's HTTP engine, the HTTP engine may present the data to the medical imaging application so that the application can display images to a user. Transmission of controls, receipt of data, and presentation of data to an application may proceed continually (as indicated by the two arrows that loops back from 210 to 206).

Figure 3:
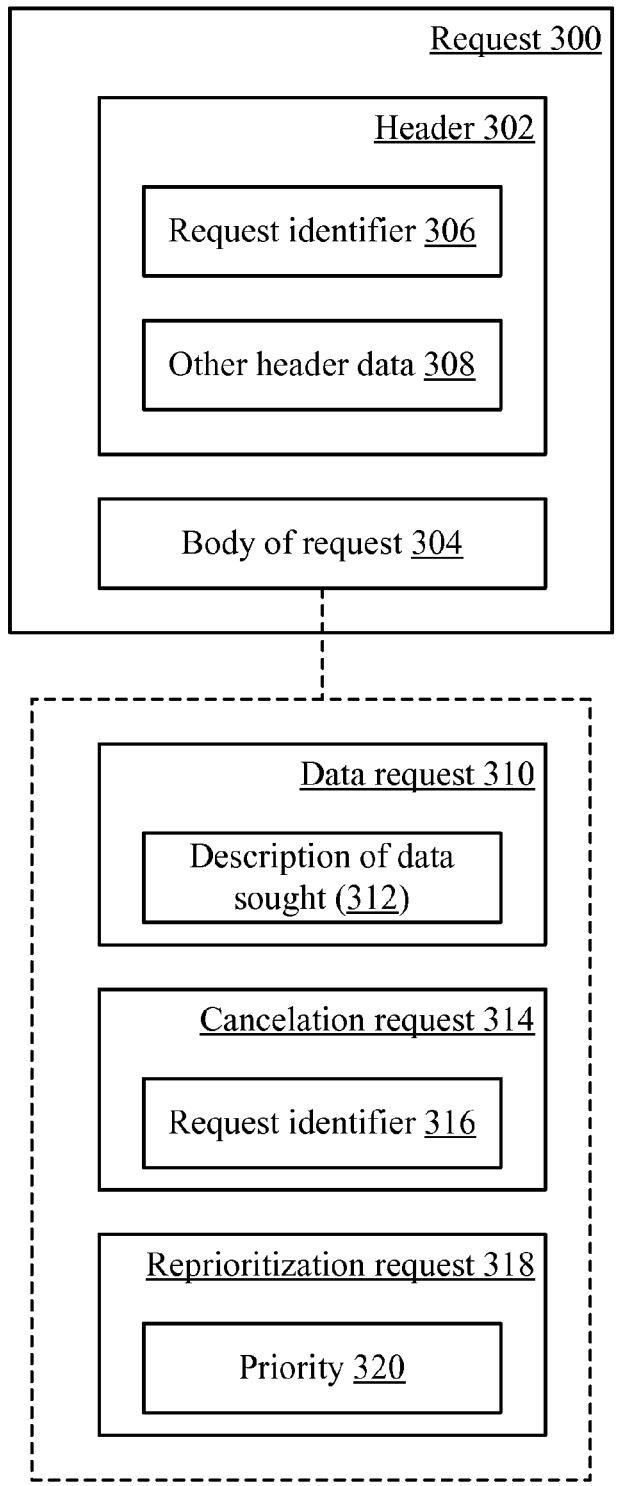
FIG. 3 is a block diagram of an example request that a client may issue to a server.

FIG. 3 shows an example of a request 300 that a client may issue to a server on the control channel. In the example shown, request 300 comprises a header 302 and a body 304. Header 302 may include a request identifier 306, as well as other header data 308. Request identifier 306 may be used for addressability—i.e., so that the client can identify a specific request when making a request such as cancelation, reprioritization, etc. Request identifier 306 may be a serial number that is assigned sequentially to requests as they are issued, although the form of request identifier 306 could be chosen in other ways. Typically, the request identifier 306 associated with a given request may distinguish that request from every other request, and serial numbers are one example way to achieve this distinguishability. Some types of requests may omit request identifier 306. E.g., addressability, in one example, might apply only to data requests, so cancelation requests and reprioritization requests might omit request identifier 306.

The body 304 of request 300 may take various forms, depending on the type of request that is being issued. FIG. 3 shows, within the dotted-line box, examples of body 304 for data requests, cancelation requests, and reprioritization requests. Other types of requests may include information in body 304 that is different from the specific examples shown.

In the example of a data request 310, body 304 comprises a description 312 of the data sought. Continuing with the example in which the client is, or comprises, a medical imaging application, the data sought may be a specific image frame or portion thereof. Thus, in such an example, body 304 may contain the following information:

"oid": an image identifier;
"frameNumber": a identifier that represent a particular spatial frame of the image that is being requested;
"region": a set of coordinates that represent the boundary of a particular spatial region within a frame—e.g., region coordinates might contain four points that define a rectangular boundary that constitutes a sub-region of a spatial frame;
"imageQuality": a descriptor of amount of compression loss in content to be delivered, and/or the resolution of the content;
"zoomDivisor": a descriptor of the magnification or demagnification at which the frame or region is to be delivered;
"activityID": a field for optional data that could be used for any purpose.

Thus, in one example, a data request issued by a client could be of the following form:
oid=1-2-17-1234-43244540985-247643&frameNumber=0
&region=0,0,100,
243&imageQuality=100&zoomDivisor=1
&activityId=3169f348-f18a-4e11-8e43-2b740aaf21b1
However, a data request could take any form.

For a cancelation request 314, body 304 may include a request identifier 316, which identifies the request for which cancelation is requested. Thus, if requests ##1-5 have been issued and the client wishes to cancel request #3, the body of cancelation request 314 may contain #3. In some implementations, body 304 might be able to contain a list of plural requests that are to be canceled; in other implementations, a cancelation request could be limited to canceling a single request, and plural cancelation requests could be issued in order to cancel more than one prior request.

For a reprioritization request 318, body 304 may contain a priority 320 to be assigned to requests that have already been issued. For example, if requests ##1-5 have already been issued and have all been assigned priority level four, then body 304 of reprioritization request 318 might contain some data indicating that requests ##2,3,4 are to be reassigned priority level five.

Table 1 shows an example format for certain types of requests.

TABLE 1

| Selector | Operation | Request id (16-byte GUID) | Payload | Corresponding responses (on data channel) |
|---|---|---|---|---|
| 1 | Frame data request | Present | Request string | Frame data, or Processing error |
| 2 | Cancelation request | Present | (Not present) | Cancellation ack |
| 3 | No-op | (Not present) | (Not present) | (none) |
| 255 | Close out | (Not present) | Ignored | (none) |

In Table 1, the "selector" column shows a number, which may appear as part of a request to indicate the type of operation that is being requested. Thus, a request that has selector=1 is a "frame data request", a request that has selector=2 is a "cancelation request", and so on. The "request id" column indicates whether request identifier 306 is present in the request. As shown in Table 1, some requests may omit request identifiers, although in one example implementation every request could have an identifier (e.g., even cancelation requests could have request numbers, thereby allowing a given cancelation request to be canceled subsequently). The "payload" column indicates what is in the body of the request. The "corresponding responses" column indicates how the server is expected to respond to a request of a particular type. The information shown in Table 1 is merely an example, and the content of requests/responses could take other forms.

It is noted that Table 1 shows "no-op" and a "close out" as types of requests. A no-op request is effectively an empty request. It can be used, for example, as a keep-alive. A close-out request instructs the server to consume the remainder of the content of the control channel without interpretation. Thus, the close out request allows the control channel to fulfill HTTP protocol expectations in an orderly fashion, even when the request packet traffic pattern does not coincide exactly with the content length specified in the HTTP POST (lack of coincidence is, in practice, a common case).

For example, suppose the next request the client wants to send involves sending a forty-five byte packet, but only twenty-six bytes of content remain available in the control channel. (It will be recalled that, when the control channel is opened as a POST request, the size of the message is specified as large but finite; thus, it is possible to run out of bytes on the current control channel.) Thus, the client may send a "close out" selector byte (which is octal 255 in the example of Table 1), and may write twenty-five additional bytes to the channel. The server sees the "close out" selector byte and reads and discards the remaining twenty-five bytes. The control channel's content has now been fully delivered according to HTTP protocol, and the channel can be closed in an orderly fashion. The client may then open a new connection in order to reestablish the control channel, and the forty-five bytes request that the client wants to submit can be written to the new channel.

When the server receives requests from the client, the server may issue responses. Table 2 shows some example responses, and examples of the content that may be contained in such responses.

TABLE 2

| Selector | Operation | Request id (16-byte GUID) | Payload | Response to (from control channel) |
|---|---|---|---|---|
| 1 | Frame data | Present | Header + frame data | Frame data request |
| 2 | Cancellation ack | Present | (Not present) | Cancellation request |
| 3 | No-op | (Not present) | (Not present) | (none) |
| 4 | Processing error | Present | Enumerated | Frame data request |

Selector values other than those shown in Table 2 may be treated as a protocol error causing the session to be torn down, because there may be no way for the client to re-sync with the packet structure. The particular types of responses shown in Table 2 are described below.

A cancellation ack response packet indicates that the server has deleted the given request and will not transmit a response containing the requested image data. It may be used for client housekeeping purposes.

A no-op response packet has the selector byte identifying it (and typically contains nothing else). It may be used, for example, as a keep-alive.

A processing error response packet informs the client that the server was unable to process a frame data request. The payload may have a numerical code indicating the particular error that occurred.

Figure 4:
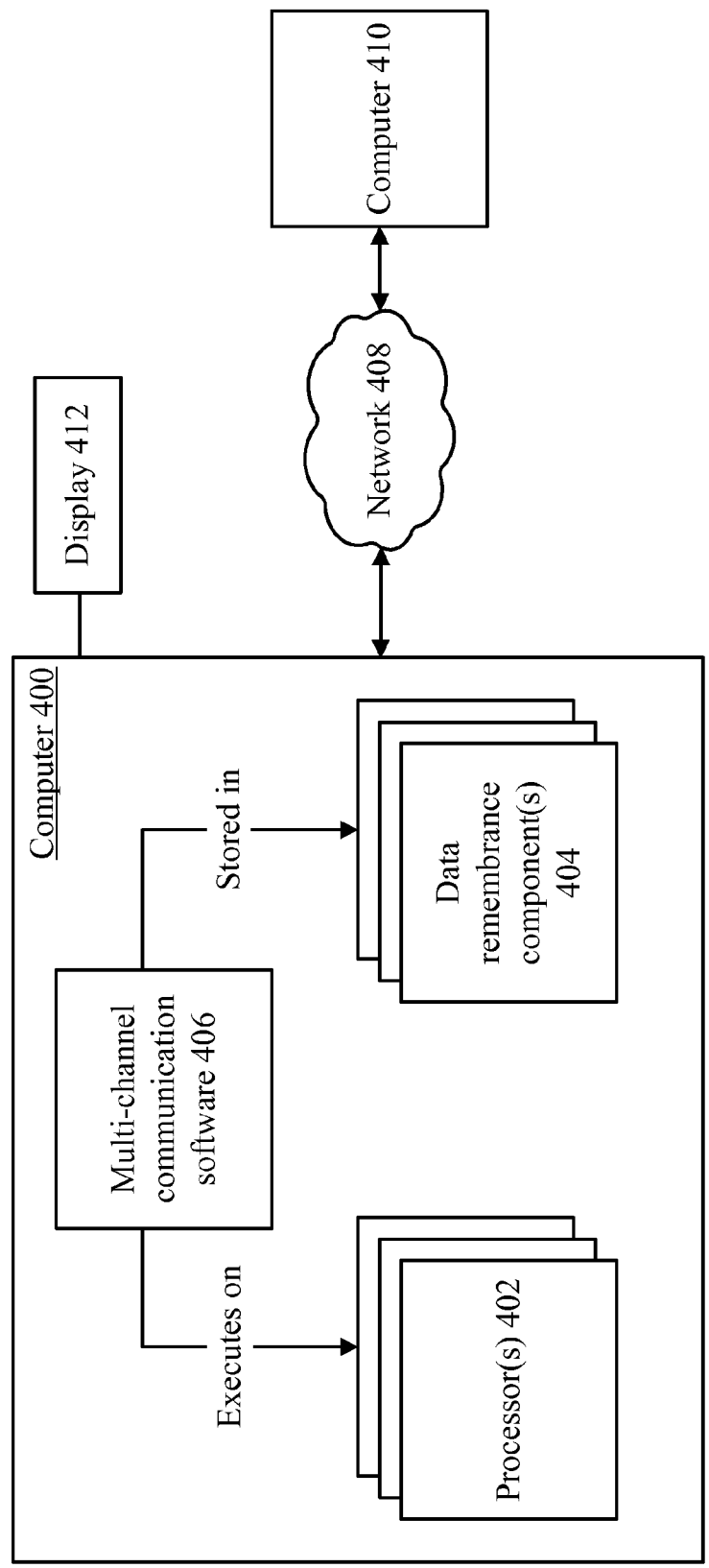
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is multi-channel communication software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

It is noted that the description and/or claims herein may refer to connections as being "different" from each other. E.g., the description and/or claims may refer to first and second connections, where the second connection "is different from" the first connection. This use of the term "different" simply means that the first and second connections are not one and the same connection. However, in this context, the term "different" does not imply that the two connections have different substantive characteristics from each other. For example, first and second connections that are described as being "different" from each other could both be of the same type (e.g., both connections could be formed as POST requests). In particular, if wording is used that calls for "a first connection" and "a second connection" where the second connection "is different from", then this wording would be satisfied as there are (at least) two connections.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage memories that store executable instructions that, when executed by a computer, cause the computer to perform acts comprising:
   opening a first connection to a server;
   opening a second connection to said server, said second connection being different from said first connection;
   transmitting, to said server over said first connection, a plurality of first requests for data;
   receiving, from said server over said second connection, data that is responsive to one or more of said first requests; and
   after said first requests have been transmitted to said server, transmitting, to said server over said first connection, a second request that identifies a first one of said first requests and that affects how said server carries out said first one of said first requests, said first one of said first requests and a second one of said first requests being transmitted to said server in a first order, said second request comprising a request to have said server carry out said first one of said first requests and said second one of said first requests in a second order that is different from said first order.

2. The one or more computer-readable storage memories of claim 1, wherein a third request comprises a request to cancel a third one of said first requests, and wherein said data that is responsive to said one or more of said first requests does not include a response to said first one of said first requests.

3. The one or more computer-readable storage memories of claim 1, wherein said first connection is created for an HTTP POST request.

4. The one or more computer-readable storage memories of claim 1, wherein said second connection is created for an HTTP GET request.

5. The one or more computer-readable storage memories of claim 1, wherein said data that is responsive to said one or more of said first requests comprises data that describe a human body, a treatment of said human body, or a diagnosis of said human body.

6. The one or more computer-readable storage memories of claim 1, wherein said acts further comprise:
   receiving a first input from an operator;
   issuing said first one of said first requests to said server based on said first input;
   receiving a second input from said operator; and
   based on said second input, issuing a third request to cancel a third one of said first requests.

7. The one or more computer-readable storage memories of claim 1, wherein each of said first requests comprises an identifier that distinguishes each one of said first requests from every other one of said first requests, and wherein said second request identifies said first one of said first requests using the identifier in said first one of said first requests.

8. A method of engaging in communication with a client, the method comprising:
   using a processor to perform acts comprising:
      opening a first connection with said client;
      opening a second connection with said client, said second connection being different from said first connection;
      receiving, from said client via said first connection, a plurality of first requests for data, each of said first requests having an identifier that distinguishes each one of said first requests from every other one of said first requests;
      transmitting, to said client via said second connection, data that is responsive to one or more of said first requests;
      receiving, from said client via said second connection, a second request to affect a first one of said first requests; and
      carrying out said second request on said first one of said first requests, said first requests comprising said first one of said first requests and a second one of said first requests, said first one of said first requests and said second one of said first requests being assigned a first priority, said second request comprising a request to reprioritize said first one of said first requests, said second one of said first requests, or both said first and second ones of said first requests, and said acts further comprising:
      carrying out said first one of said first requests and said second one of said first requests in said second order that respects relative priority of said first one of said first requests and said second one of said first requests.

9. The method of claim 8, wherein:
   said first connection is initiated by said client by way of an HTTP POST request with a message size; and
   said second connection is initiated by said client by way of an HTTP GET request.

10. The method of claim 8, wherein said transmitting comprises:
   using chunked encoding to send said data that is responsive to one or more of said first requests.

11. The method of claim 8, wherein said data that is responsive to one or more of said first requests comprises image data.

12. The method of claim 8, wherein said data that is responsive to one or more of said first requests comprises an image of a physical feature of a human body.

13. The method of claim 8, wherein a third request comprises a request to cancel a third one of said first requests, and wherein said acts further comprise:
   canceling said first one of said first requests prior to transmitting data that responds to said first one of said first requests.

14. A system that communicates with a client, the system comprising:
   a processor;
   a data remembrance component; and
   a communication component that is stored in said data remembrance component and that executes on said processor, said communication component opening a first HTTP connection and a second HTTP connection with said client, said first HTTP connection being opened upon receipt of a POST request from said client, said second HTTP connection being opened upon receipt of a GET request from said client, said communication component receiving, from said client via said first HTTP connection, a plurality of first requests for data, each of said first requests having an identifier that distinguishes each one of said first requests from every other one of said first requests, said communication component providing to said client, via said second HTTP connection, data that is responsive to one or more of said first requests, said communication component receiving, from said client via said first HTTP connection, a second request to reprioritize said first one of said first requests, said communication component carrying out said first one of said first requests and a third one of said first requests in an order that respects priority among said first requests.

15. The system of claim 14, wherein said communication component uses chunked encoding to transmit, to said client, said data that is responsive to one or more of said first requests.

16. The system of claim 14, wherein said POST request specifies a message size, wherein said communication component determines that said message size has been exhausted by data transmitted over said first HTTP connection, wherein said communication component closes said first HTTP connection, and wherein a new POST request is subsequently received to open a new instance of said second first connection.

17. The system of claim 14, wherein said data that is responsive to one or more of said first requests comprises images, or portions of images, of a physical feature of a human body, or images of a diagnosis or treatment of said human body.

* * * * *